(12) United States Patent
Mizuno et al.

(10) Patent No.: US 9,061,606 B2
(45) Date of Patent: Jun. 23, 2015

(54) ELECTRIC RELEASE MANUAL SEAT

(71) Applicant: AISIN TECHNICAL CENTER OF AMERICA, INC., Plymouth, MI (US)

(72) Inventors: Ryosuke Mizuno, Novi, MI (US); Michael Mixon, Plymouth, MI (US)

(73) Assignee: AISIN TECHNICAL CENTER OF AMERICA, INC., Plymouth, MI (US)

( * ) Notice: Subject to any disclaimer, the term of this patent is extended or adjusted under 35 U.S.C. 154(b) by 166 days.

(21) Appl. No.: 13/856,270

(22) Filed: Apr. 3, 2013

(65) Prior Publication Data

US 2014/0300159 A1  Oct. 9, 2014

(51) Int. Cl.
*B60N 2/12* (2006.01)
*B60N 2/02* (2006.01)

(52) U.S. Cl.
CPC .......... *B60N 2/12* (2013.01); *B60N 2/0232* (2013.01); *B60N 2002/0236* (2013.01)

(58) Field of Classification Search
USPC ............. 297/340, 341, 344.17, 334, 463, 297/362.11, 330
See application file for complete search history.

(56) References Cited

U.S. PATENT DOCUMENTS

| | | | | | |
|---|---|---|---|---|---|
| 4,615,232 | A | * | 10/1986 | Puppala | 74/473.11 |
| 4,634,180 | A | * | 1/1987 | Zaveri et al. | 297/341 |
| 4,653,807 | A | * | 3/1987 | Hirose et al. | 297/367 R |
| 5,292,178 | A | * | 3/1994 | Loose et al. | 297/344.1 |
| 5,348,373 | A | * | 9/1994 | Stiennon | 297/344.1 |
| 5,683,140 | A | * | 11/1997 | Roth et al. | 297/344.1 |
| 5,813,726 | A | * | 9/1998 | Husted | 297/378.11 |
| 6,036,267 | A | * | 3/2000 | Downey et al. | 297/341 |
| 6,098,946 | A | * | 8/2000 | Sechet et al. | 248/424 |
| 6,443,414 | B1 | * | 9/2002 | Horsfield et al. | 248/429 |
| 7,472,957 | B2 | * | 1/2009 | Ferry et al. | 297/343 |
| 7,472,963 | B2 | * | 1/2009 | Jeong | 297/463.1 |
| 8,042,868 | B2 | * | 10/2011 | Sakai et al. | 297/217.3 |
| 8,162,404 | B2 | * | 4/2012 | Ueda | 297/463.1 |
| 8,439,443 | B2 | * | 5/2013 | Nakane et al. | 297/378.12 |
| 8,677,848 | B2 | * | 3/2014 | Koga et al. | 74/425 |

(Continued)

FOREIGN PATENT DOCUMENTS

| | | |
|---|---|---|
| JP | 60-184734 | 12/1985 |
| JP | 2006-335148 | 12/2006 |

OTHER PUBLICATIONS

U.S. Appl. No. 13/916,222, filed Jun. 12, 2013, Mizuno, et al.

(Continued)

*Primary Examiner* — David R. Dunn
*Assistant Examiner* — Timothy J Brindley
(74) *Attorney, Agent, or Firm* — Oblon, McClelland, Maier & Neustadt, L.L.P.

(57) ABSTRACT

A release mechanism of a seat, including a two way motion actuator that moves in both a first direction and in a second direction; a recliner release mechanism that releases a recliner of the seat in response to the two way motion actuator moving in the first direction; and a slide release mechanism that releases a slide mechanism of the seat in response to the two way motion actuator moving in the second direction. The release mechanism also including a first unintentional movement prevention device that prevents the slide mechanism from being released when the two way motion actuator moves in the first direction; and a second unintentional movement prevention device that prevents the recliner from being released when the two way motion actuator moves in the second direction.

11 Claims, 12 Drawing Sheets

(56) References Cited

U.S. PATENT DOCUMENTS

| | | | |
|---|---|---|---|
| 8,801,101 B2* | 8/2014 | Dagcioglu et al. | 297/331 |
| 2003/0080598 A1* | 5/2003 | Becker et al. | 297/341 |
| 2004/0113473 A1* | 6/2004 | Kojima | 297/341 |
| 2008/0073960 A1* | 3/2008 | Nakaya et al. | 297/341 |
| 2009/0026791 A1* | 1/2009 | Ishijima et al. | 296/65.18 |
| 2009/0026825 A1* | 1/2009 | Ishijima et al. | 297/358 |
| 2009/0058158 A1* | 3/2009 | Sobieski | 297/338 |
| 2009/0160234 A1* | 6/2009 | Becker et al. | 297/341 |
| 2009/0230752 A1* | 9/2009 | Adragna et al. | 297/463.1 |
| 2009/0243359 A1* | 10/2009 | Yoshida et al. | 297/341 |
| 2010/0109404 A1* | 5/2010 | Yamagishi et al. | 297/341 |
| 2010/0244524 A1* | 9/2010 | Kumazaki et al. | 297/341 |
| 2011/0127818 A1* | 6/2011 | Hazlewood | 297/341 |
| 2014/0300162 A1* | 10/2014 | Udriste et al. | 297/340 |
| 2014/0339871 A1* | 11/2014 | Mixon et al. | 297/341 |

OTHER PUBLICATIONS

Office Action issued Mar. 3, 2015 in Japanese Patent Application No. 2014-041790 (with English translation).

* cited by examiner

ELECTRIC RELEASE MANUAL SEAT

BACKGROUND OF THE INVENTION

1. Field of the Invention

Exemplary aspects of the present invention relate to the locking and releasing of a recliner mechanism and a slide mechanism of a vehicle seat and in particular to electrically actuating the release of these mechanisms.

2. Description of the Related Art

Seats of a vehicle such as an automobile may be provided with a reclining mechanism that allows the seat back to pivot at a base portion thereof. This reclining mechanism may have several defined positions including: a neutral position, an upright position, a rear most position, and a front most position.

Seat of a vehicle such as an automobile may also be provided with a sliding mechanism that allows the seat to travel in the fore-aft direction of the vehicle. This sliding movement allows the seat occupant to find the optimal seat location. For example, the occupant may be a driver of the vehicle and the sliding mechanism is used to insure the drive is adequately placed to reach all of the vehicle controls.

Both the reclining mechanism and the sliding mechanism may be operated using individual manual levers, typically located on the vehicle seat. Also the reclining mechanism and the sliding mechanism may be replaced by an actuator that performs the sliding and reclining functions without additional effort from the user. Seats equipped with these features are typically called power seats or power assisted seats.

The actuators above provide convenience and a luxury feeling compared to the manual levers described above. However, these individual actuators and the associated mechanisms to effect the releases are complicated and high mass.

SUMMARY OF THE INVENTION

A release mechanism of a seat, including a two way motion actuator that moves in both a first direction and in a second direction; a recliner release mechanism that releases a recliner of the seat in response to the two way motion actuator moving in the first direction; and a slide release mechanism that releases a slide mechanism of the seat in response to the two way motion actuator moving in the second direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF THE PREFERRED EMBODIMENTS

Referring now to the drawings, wherein like reference numerals designate identical or corresponding parts throughout the several views. Further, as used herein, the words "a," "an" and the like generally carry a meaning of "one or more," unless stated otherwise.

FIGS. 1-14 depict various aspects of a recliner mechanism and a sliding mechanism for a vehicle seat. Here a vehicle refers to a land vehicle exemplified by an automobile. However, the present disclosure is also applicable to any similar type vehicle, such as but not limited to, a sport utility vehicle, a pickup truck, a commercial vehicle or the like.

Figure 1:
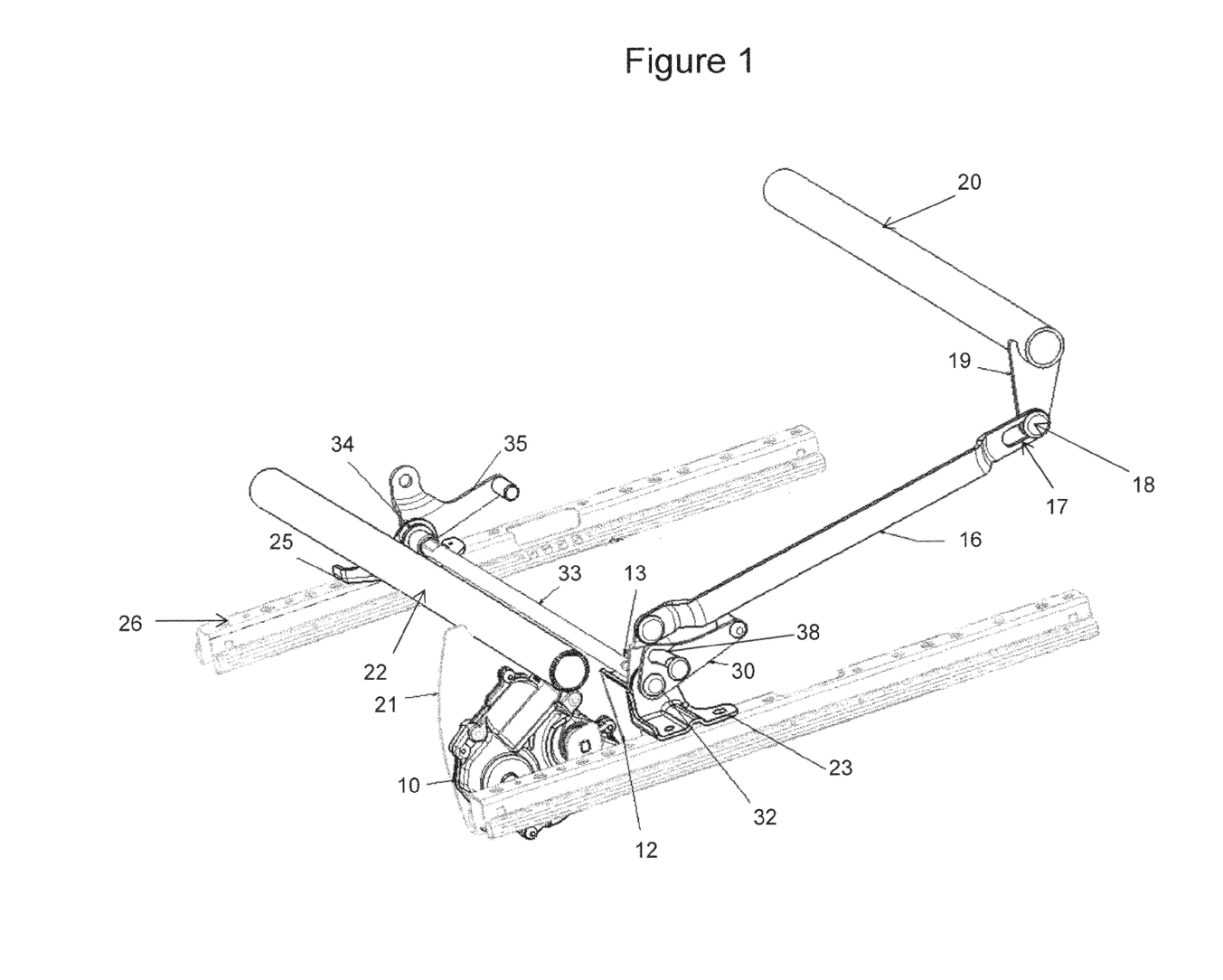
FIG. 1 illustrates a view of a recliner mechanism and sliding mechanism of a vehicle seat in accordance with an exemplary aspect of the disclosure.

FIG. 1 illustrates schematically a vehicle a recliner mechanism and a sliding mechanism in accordance with the present disclosure. A partially illustrated seat includes a two way motion actuator 10 attached to an attachment plate 21. The attachment plate 21 attaches to a front torsion tube 22, which attaches to a seat frame (not illustrated).

The seat includes upper rails 24 and 26 which extend in the fore-aft direction of the vehicle. The upper rails 24 and 26 slide in the fore-aft direction relative to lower rails (not illustrated). The two way motion actuator 10 is located inward of the upper rail 24.

Figure 2:
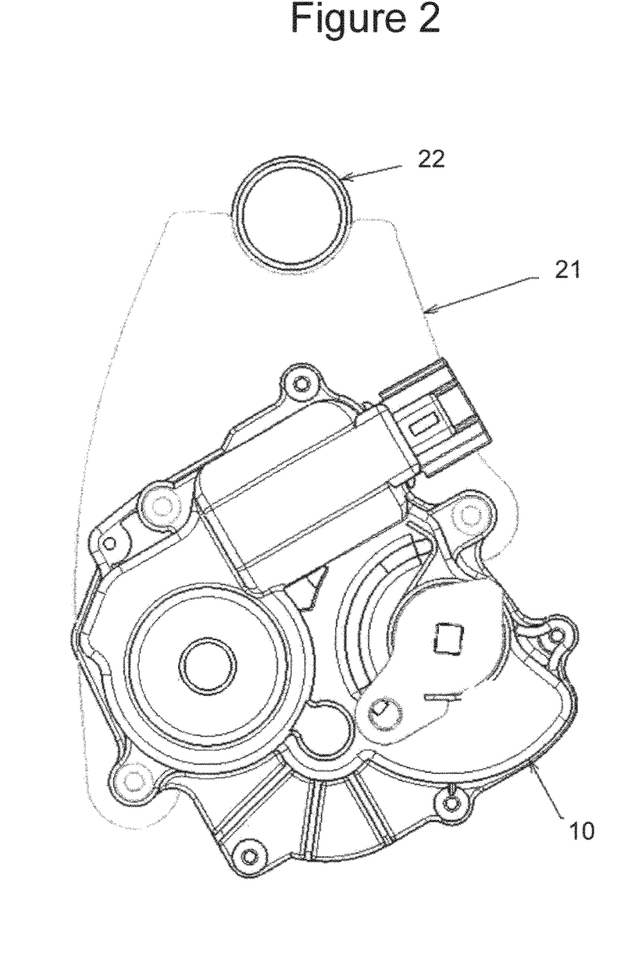
FIG. 2 illustrates a view of an exemplary actuator.

FIG. 2 illustrates an exemplary embodiment of the two way motion actuator 10. Here, the two way motion actuator 10 is a motor which rotates in both a clockwise and counterclockwise (anticlockwise) direction. The two way motion actuator 10 is here described as an electric motor, but could also be another type of electric actuator with multiple positions such as a piston or solenoid. The two way motion actuator 10 is not limited to just two motions but rather includes at least two motions.

Figure 3:
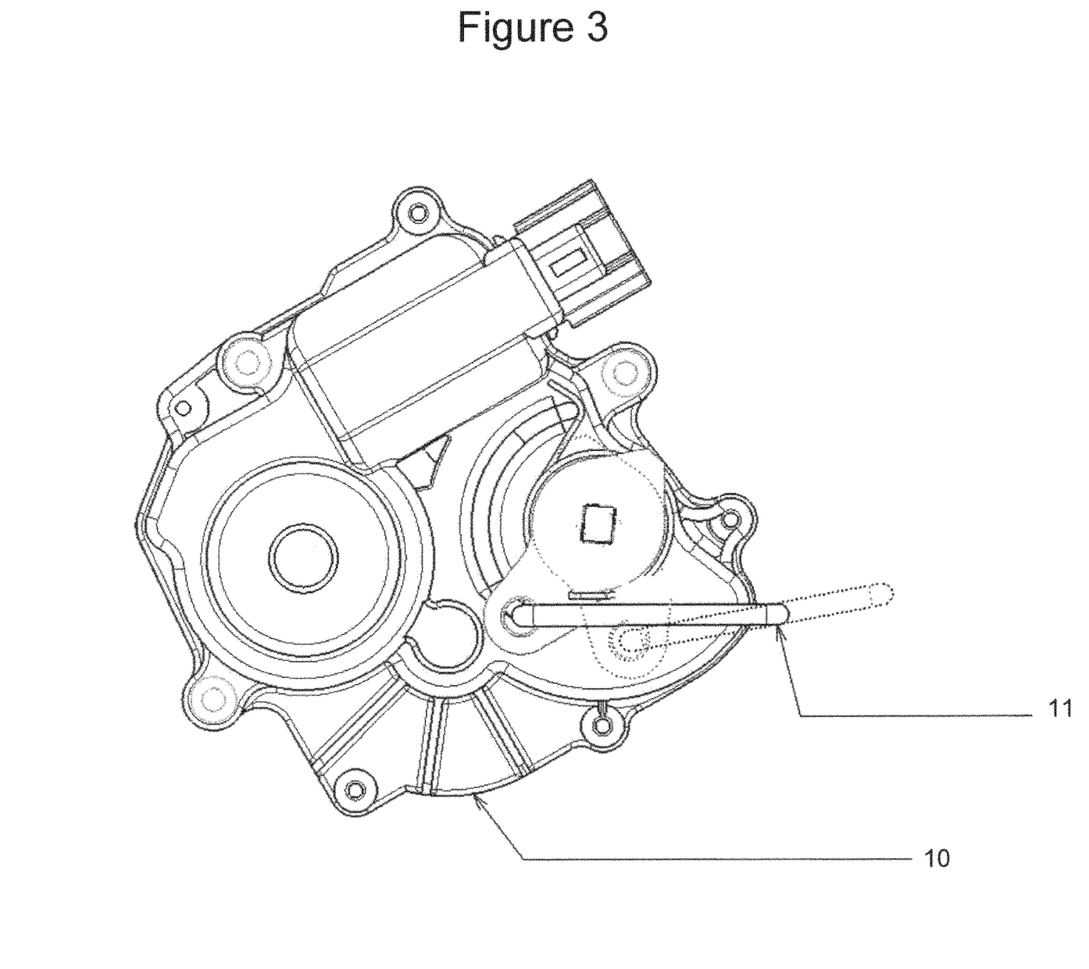
FIG. 3 illustrates a view a recliner mechanism in accordance with an exemplary aspect of the disclosure.

Push pull link 11 is attached to the actuator 10, as illustrated in FIG. 3. When the two way motion actuator 10 moves in a first direction (illustrated as counterclockwise in FIG. 3) the push pull link 11 moves away from the two way motion actuator 10. The dashed outline of the push pull link 11 illustrates the motion of the push pull link 11 after the two way motion actuator 10 has rotated in the counterclockwise direction.

Figure 4:
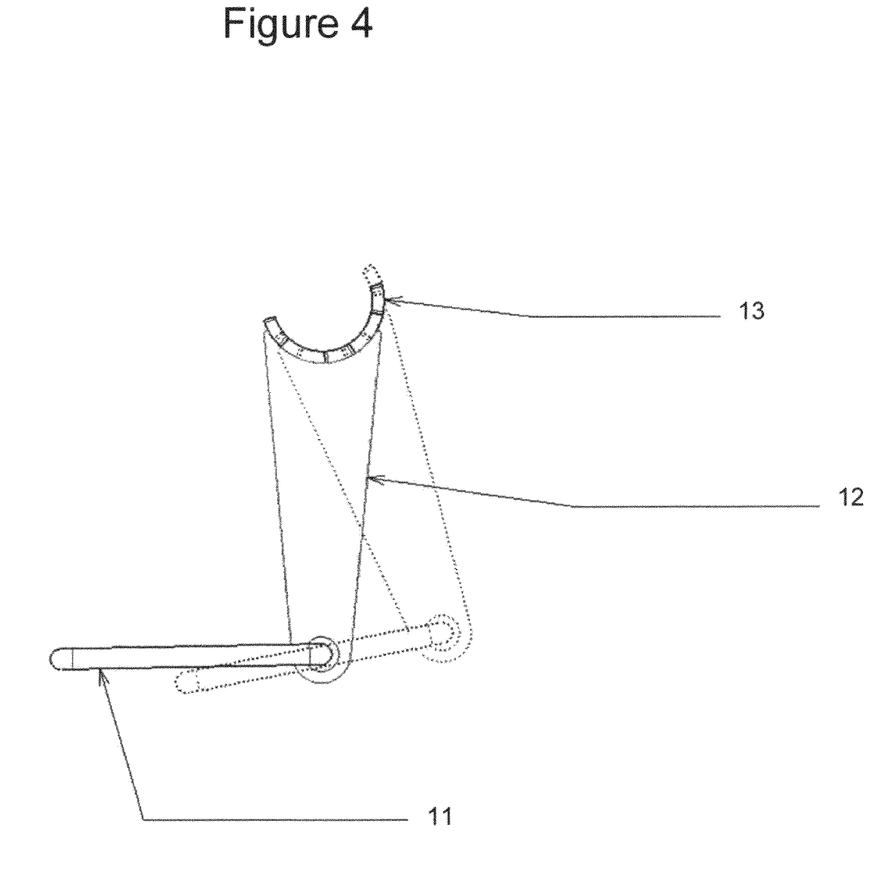
FIG. 4 illustrates a view a recliner mechanism in accordance with an exemplary aspect of the disclosure.

FIG. 4 illustrates that the other end of the push pull link 11 that is not attached to the two way motion actuator 10 is attached to a rotation link 12 at a bottom part thereof. The rotation link 12 is roughly triangular in shape illustrated in FIG. 4 but the particular configuration of the rotation link 12 can be changed to fit various geometries.

FIG. 4 shows the motion of the rotation link 12 by the push pull link 11. In particular, when the two way motion actuator 10 moves from the first position to the second position the push pull link 11 moves the rotation link 12 from a first position to a second position illustrated in FIG. 4 by a dashed line. As shown in FIG. 4, the rotation link is moved rightward in FIG. 4 by the movement of the two way motion actuator 10.

Half tube 13 is attached at an upper portion of the rotation link 12. The half tube 13 may be in the shape of an extruded, hollowed-out semicircle. The half tube 13 is essentially the shape of a pipe which has been cut in half along its axial direction.

Figure 5:
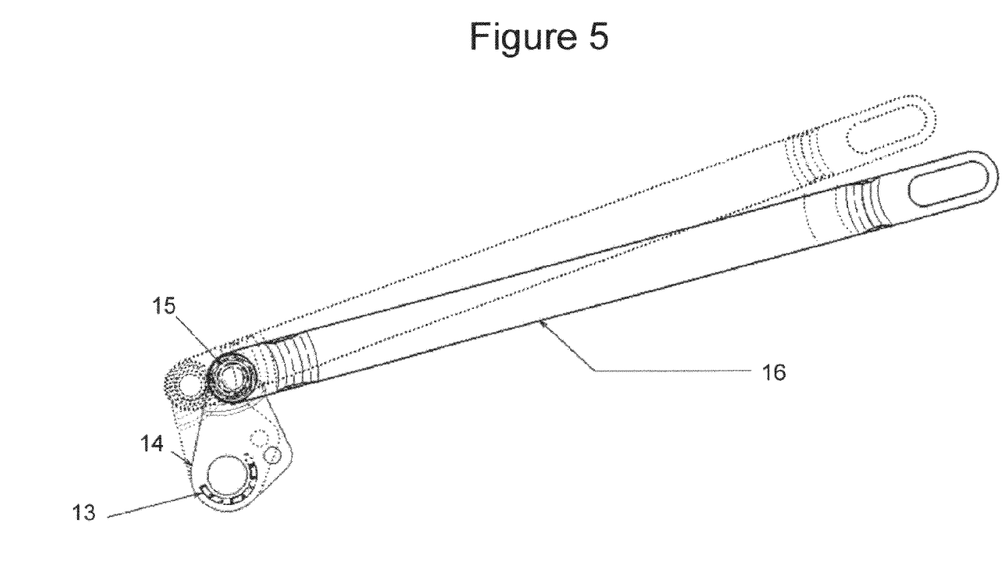
FIG. 5 illustrates a view a recliner mechanism in accordance with an exemplary aspect of the disclosure.

An end of the half tube 13 in the axial direction is connected to an inboard side of a center rotation link 14, which is illustrated in FIG. 5. An upper portion of the center rotation link 14 includes a riveting 15 which rotatably attaches the center rotation link 14 to the recliner pull link 16.

The recliner pull link 16 extends between the center rotation link 14 and the recliner release lever 19. The recliner pull link 16 extend substantially in the fore-aft direction of the vehicle. Discussed above, the recliner pull link 16 is attached to the center rotation link 14 by riveting 15. When the center rotation link 14 is moved by the two way motion actuator 10 (via the push pull link 11, the rotation link 12, and the half tube 13), the recliner pull link 16 is moved. The recliner pull link 16 is moved leftward as shown in FIG. 5, illustrated by the dashed line.

The recliner pull link 16 includes a slot hole 17 located at the end of the recliner pull link 16 opposite the end attached to the center rotation link 14. The slot hole 17 is formed substantially in the same length direction of the recliner link 16. The slot hole 17 is provided with a riveting 18 which is able to slide the length of the slot hole 17. That is, the riveting 18 is able to travel the length of the slot hole 17 depending on the movement of the recliner pull link 16.

Figure 7:
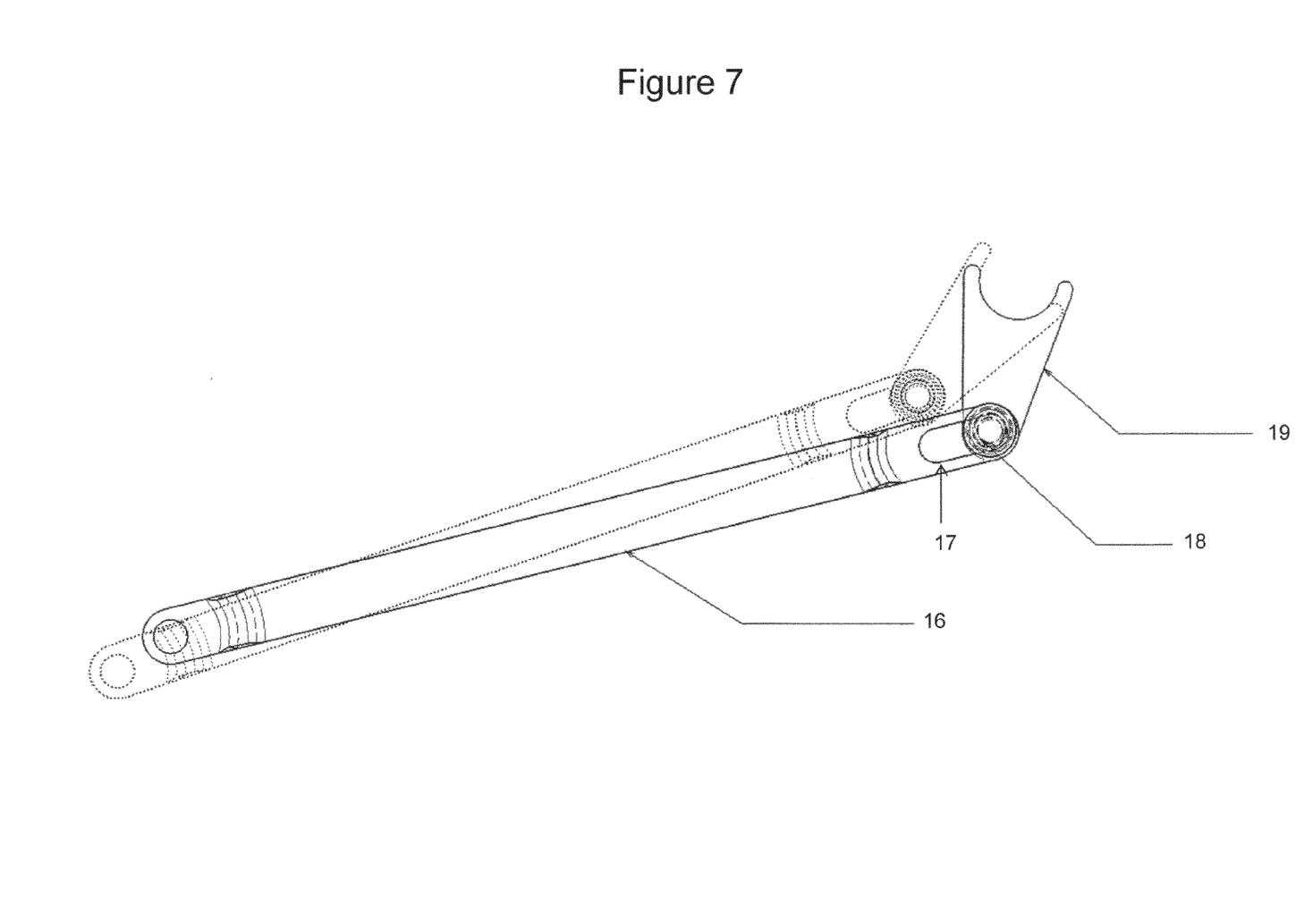
FIG. 7 illustrates a view a recliner mechanism in accordance with an exemplary aspect of the disclosure.

The riveting 18 is attached to recliner release lever 19 as shown in FIGS. 1 and 7. The recliner release lever 19 has an approximately triangular shape with the riveting 18 located at a bottom portion thereof. However, the shape of the recliner release lever can be modified as necessary for the geometry of the seat apparatus. The recliner release lever is connected to the recliner connecting tube 20. The recliner connecting tube 20 being connected to a recliner mechanism (not illustrated) in order to release the recliner from a locked state.

As shown in the FIGS. 1-7, the two way movement actuator 10 releases the recliner from a locked state via the mechanism described above. In particular, the two way motion actuator 10 moves in a first direction to push the push pull link 11. The push pull link 11 moves the rotation link 12 which moves the center rotation link 14 via the half tube 13. The center rotation link 14 pulls the recliner pull link 16 via the riveting 15. The direction of movement is leftward as illustrated in FIG. 5. When the recliner pull link 16 is pulled by the rotation link 14, the recliner pull link 16 begins to act on the riveting 18 once the recliner pull link 16 is pulled a sufficient distance for the riveting 18 to reach the end of the slot hole 18. Once the riveting 18 contacts the end of the slot hole 17 that is opposite the center rotation link 14, further movement of the recliner pull link 16 will pull the recliner release plate 19 via the riveting 18. Accordingly, the recliner is released from the locked state by movement of the two way motion actuator 10 moving in a first direction. Once the recliner is released form the locked state, a user may manually adjust the recline angle of the seat.

Figure 8:
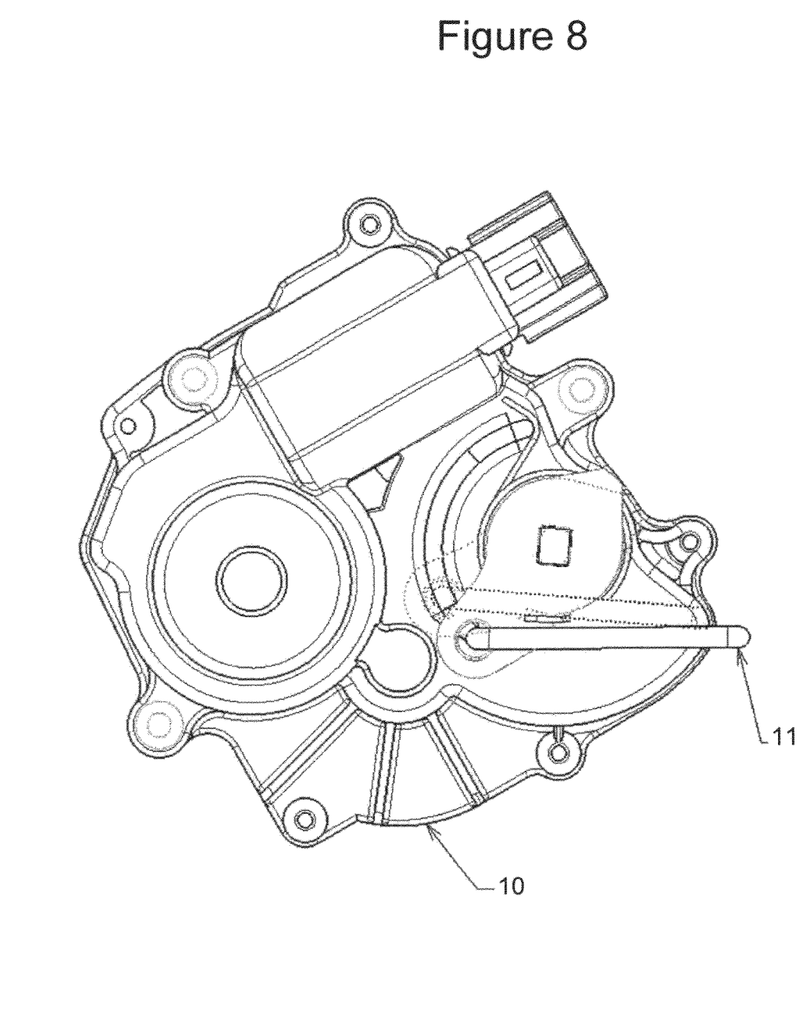
FIG. 8 illustrates a view a sliding mechanism in accordance with an exemplary aspect of the disclosure.

A slide release mechanism will be described referring primarily to FIGS. 8-14. FIG. 8 is a view of the same two way motion actuator 10 shown in FIG. 3. However, FIG. 8 shows the two way motion actuator 10 moving in a second direction as illustrated by the dashed lines. The second direction corresponds to a clockwise rotation of the two way motion actuator which correspondingly pulls the push pull link 11 primarily leftward in FIG. 8. As described above, the two way motion actuator is not limited to a rotational motion and the first and second directions are not limited to clockwise and counterclockwise movements.

Figure 9:
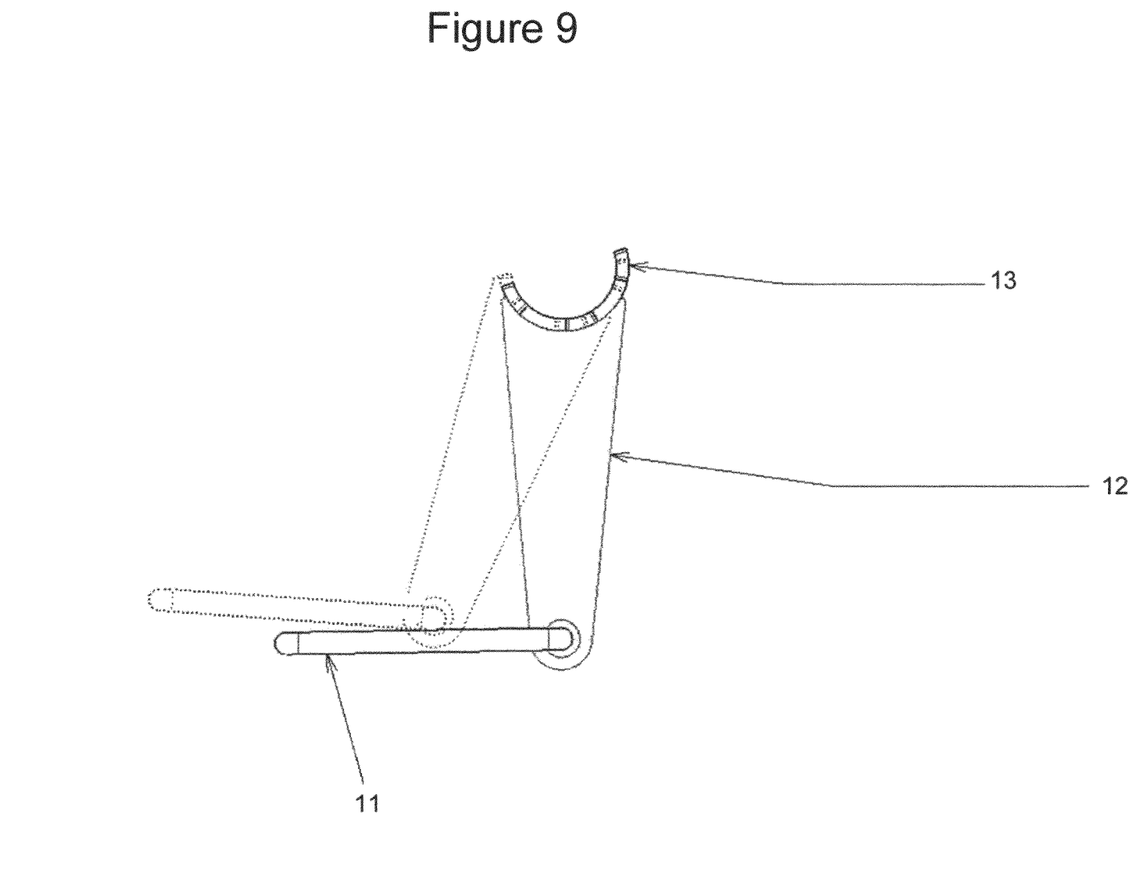
FIG. 9 illustrates a view a sliding mechanism in accordance with an exemplary aspect of the disclosure.

The movement of the two way motion actuator 10 in the second direction pulls the rotation link 12 and half tube 13 as illustrated in FIG. 9. The dashed lines of FIG. 9 illustrate this movement of the rotation link 12. As shown in FIG. 9, the rotation link 12 moves primarily leftward in FIG. 9 due to the movement of the two way motion actuator 10 in the second direction. In contrast, FIG. 4 illustrates the movement of the rotation link 12 primarily rightward based on the pushing of the push pull link 11 when the two way motion actuator operates in the first direction.

Figure 10:
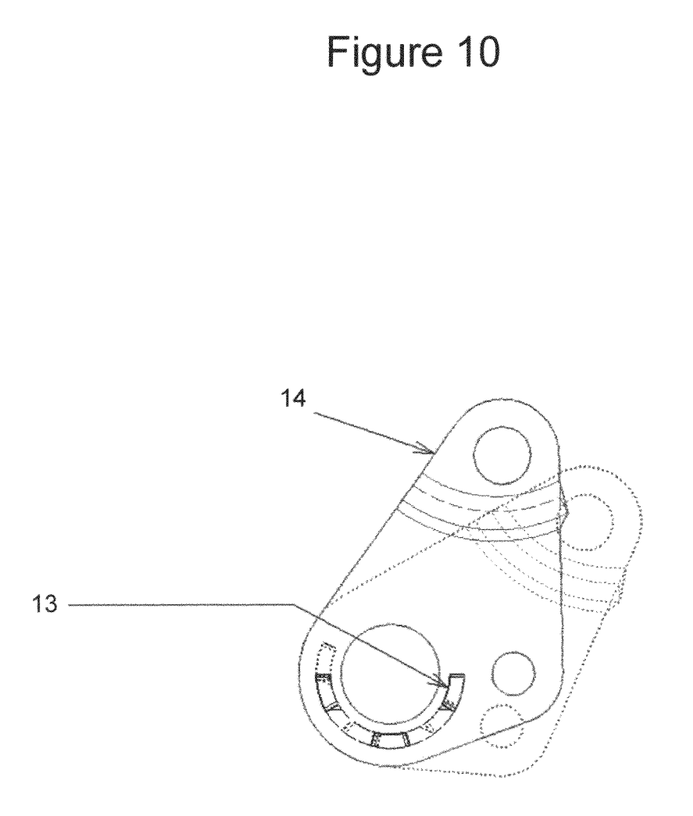
FIG. 10 illustrates a view a sliding mechanism in accordance with an exemplary aspect of the disclosure.

FIG. 10 illustrates that movement of rotation link 12 causes the center rotation link 14 to rotate via the connection of the half tube 13 between the rotation link 12 and center rotation link 14. This rotation is illustrated by a dashed line in FIG. 10. FIG. 10 can be compared to the rotation of the center link 14 illustrated in FIG. 5. In FIG. 5, the center rotation link 14 rotates in the counterclockwise position due to the movement of the two way motion actuator 10 moving in the first direction. In contrast, FIG. 10 illustrates that the center rotation link 14 rotates in the clockwise direction due to the movement of the two way motion actuator 10 moving in the second direction.

Extending from the center rotation link 14 is slide pin 31. The slide pin 31 extends through a slot hole 38 provided to the slide release lever 30. These features can be seen in FIGS. 1, 11, 13, and 14. The slot hole 38 is illustrated in the figures has have an arc shaped. However, the slot hole 38 is not limited to such a shape.

Figures 11, 12:
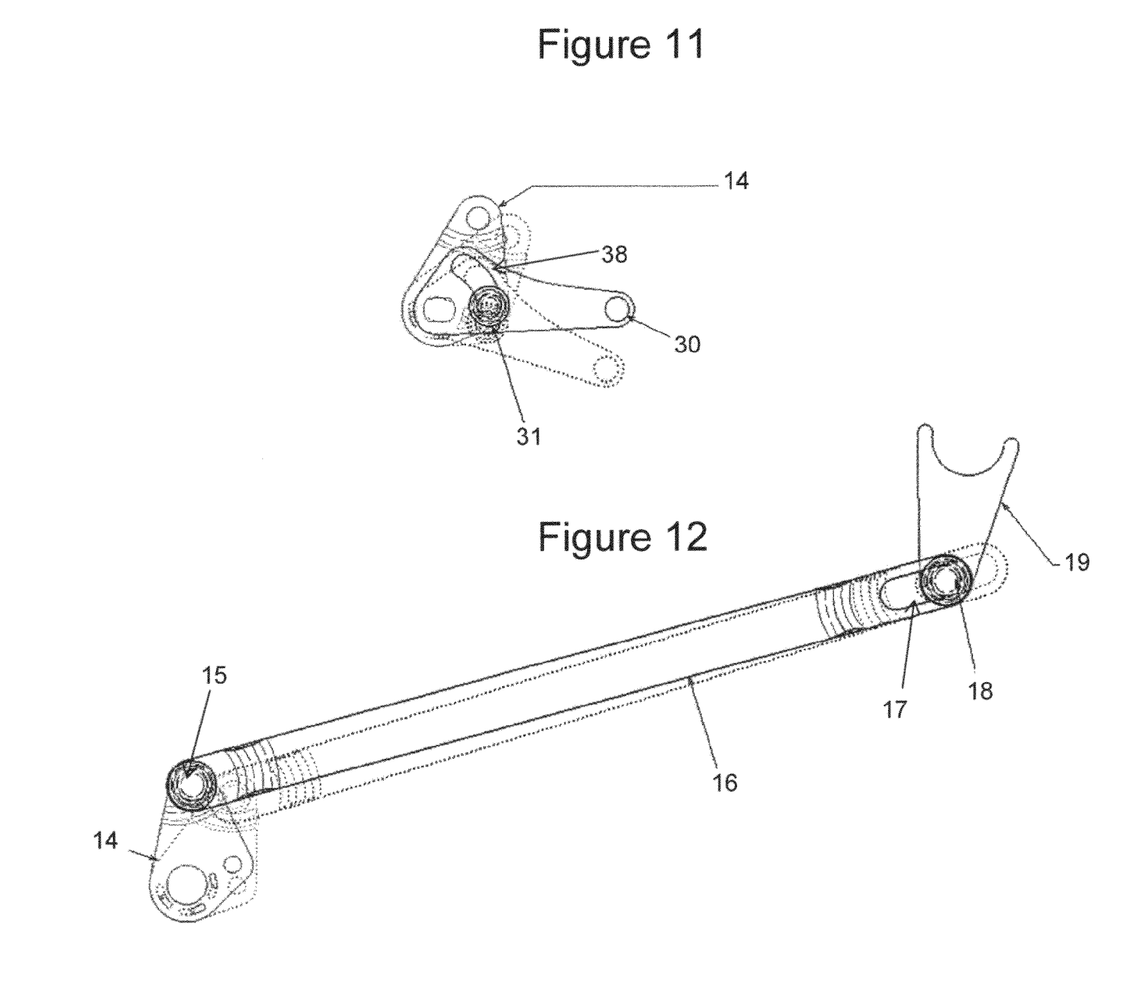
FIG. 11 illustrates a view a sliding mechanism in accordance with an exemplary aspect of the disclosure.
FIG. 12 illustrates a view a sliding mechanism in accordance with an exemplary aspect of the disclosure.

FIG. 11 illustrates that the rotation of the center rotation link caused by the two way motion actuator moving the second direction illustrated by the dashed line (see also FIG. 10). In FIG. 11, the slide pin 31 moves in a generally downward direction caused by the movement (rotation) of the center rotation link 14 described above. As the slide pin 31 moves it travels within the slot hole 38 provided to the slide release lever 30. When the slide pin 31 travels a sufficient distance within the slot hole 38, contact will be made with the end of the slot hole 38 located downward in FIG. 11. At this point, further movement of the slide pin 31 caused by the rotation of the center rotation link 14 will cause the slide release lever 30 to rotate. The axis of rotation is the center caulking pin 32 as viewed in FIG. 1.

Figure 13:
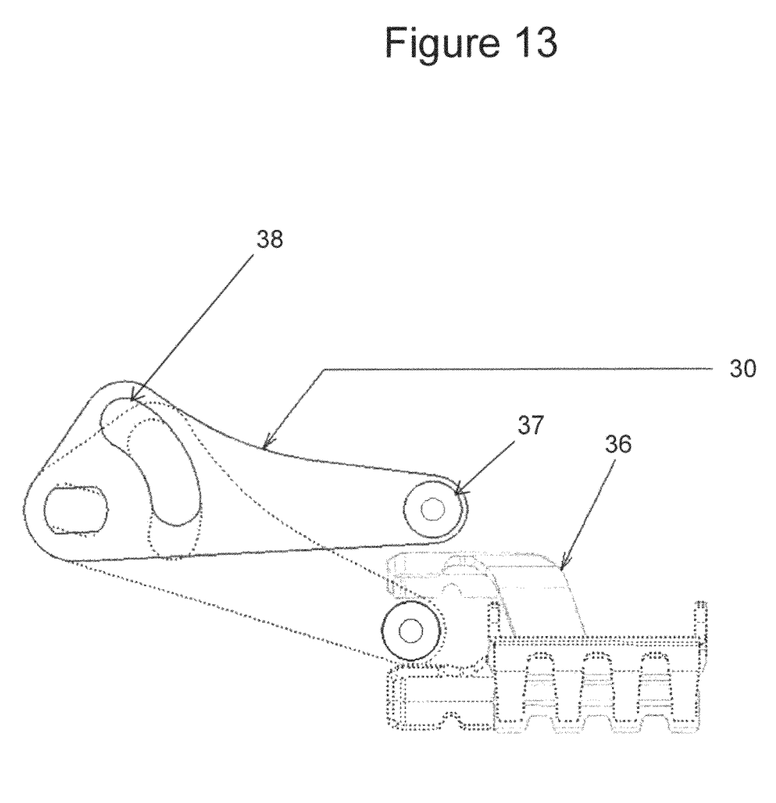
FIG. 13 illustrates a view a sliding mechanism in accordance with an exemplary aspect of the disclosure.

The movement of the slide release lever 30 caused by the slide pin 31 is illustrated by a dashed line in FIG. 11. The slide release lever 30 moves in a downward direction as illustrated in FIG. 11. FIG. 13 shows an additional view of this movement.

FIG. 13 shows that when the slide release lever moves a sufficient distance that the lock pin 37, located at an end of the slide release lever 30, releases from the lock lever 36. The lock lever pin 37 extends inwardly as partially illustrated by FIG. 1. When the lock lever pin 37 is released from lock lever 36 the track slide (not pictured) is able to move.

Figure 14:
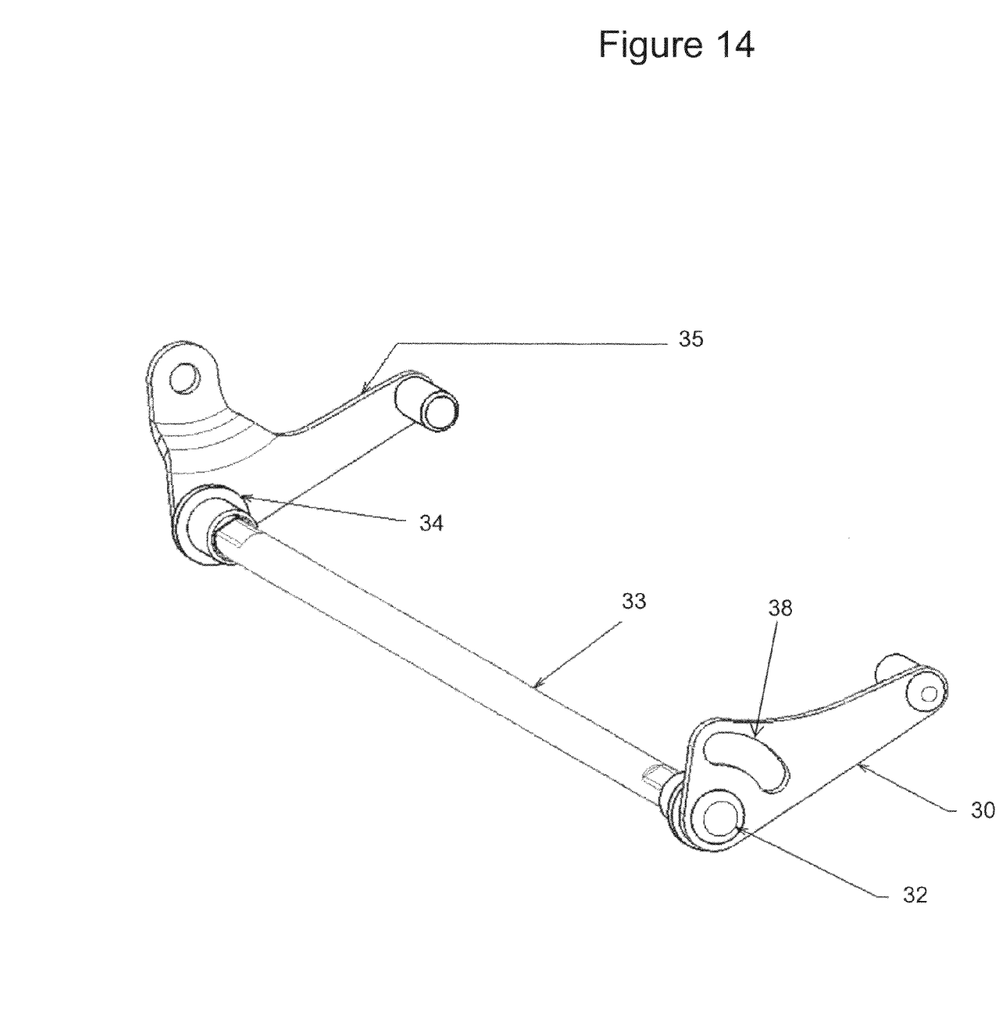
FIG. 14 illustrates a view a sliding mechanism in accordance with an exemplary aspect of the disclosure.

FIG. 14 illustrates a second slide release lever 35 which is connected to the slide release lever 30 by center rotation tube 33. Caulking pin 32 attaches the slide release lever 30 to the center rotation tube 33. Similarly, caulking pin 34 attaches the slide release lever 35 to the center rotation tube 33. The slide release lever 30 and slide release lever 35 can be called a first and second slide release lever, respectively.

Therefore, any movement imparted to the slide release lever 30 by the slide pin 31 also moves the slide release lever 35 via the center rotation tube 33. The slide release lever 35 includes a lock lever pin (unnumbered) that extends inwardly as illustrated in FIG. 1. when the slide release lever 35 moves a sufficient distance the included lock lever pin releases from the associated lock lever (not illustrated). Accordingly, the track slide on both sides of the seat are released and the seat is free to slide in the fore-aft direction. Once the slide mechanism is released form the locked state, a user may manually adjust the location of the seat in the fore-aft direction.

Described above, the two way movement actuator 10 releases the slide mechanism from a locked state. In particular, the two way motion actuator 10 moves in a second direction to pull the push pull link 11. The push pull link 11 moves the rotation link 12 which moves the center rotation link 14 via the half tube 13. The center rotation link 14 includes a slide pin 31 which moves within a slot hole 38 of the slide release lever 30. Movement of the center rotation link 14 therefore pushes the slide release lever 30 downward as illustrated in FIG. 11 once the slide pin 31 reaches the end of the slot hole 38. The slide release lever 30 moves a sufficient distance to release the lock lever pin 37 from the lock lever 36. Simultaneously, the slide release lever 35 releases the associated lock lever pin 37 from the opposite lock lever. Accordingly, the slide mechanism is released from the locked state by movement of the two way motion actuator 10 moving in the second direction.

Figure 6:
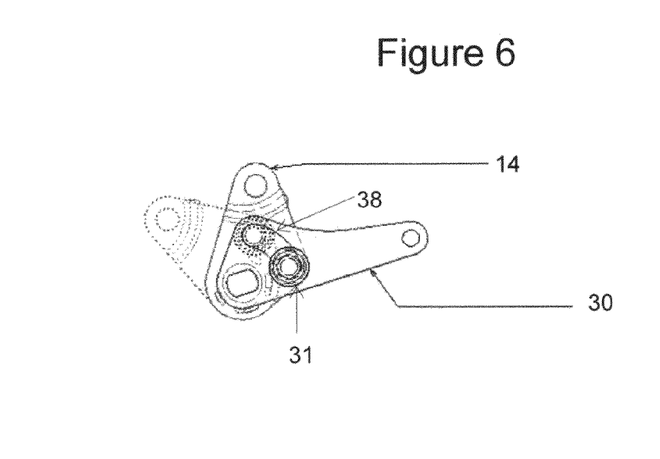
FIG. 6 illustrates a view a sliding mechanism in accordance with an exemplary aspect of the disclosure.

As described above, the two way motion actuator 10 can release both the recline mechanism and the slide mechanism depending on whether the two way motion actuator 10 moves in the first direction or in the second direction. FIGS. 6 and 12 will now be used to describe how unintentional release of the respective slide mechanism and recliner mechanism is prevented when the respective other mechanism is released.

FIG. 6 illustrates the movement of the center rotation link 14 when the two way motion actuator is moved in the first direction to release the recliner mechanism (see also FIG. 5). As shown in FIG. 6, the center rotation link 14 moves leftward shown in the dashed line due to the two way motion actuator 10 moving in the first direction. Due to the movement of the center rotation link 14, the slide pin 31 moves within the slot hole 38 of the slide release lever 30. Here, the slide pin 31 moves primarily upward in the slot hole 38. Therefore, the slide release lever does not move downward as shown in FIG. 11 to release the slide mechanism. That is, the slide pin 31 never travels to the downward end of the slot hole 38 in order to push the slide release lever 30 in the downward direction to release the slide mechanism. Accordingly, the arrangement of the slide pin 31 and the slot hole 38 prevents unintended release of the slide mechanism when the two way motion actuator 10 is moved in the first direction to release the recliner mechanism. That is, the movement of slide mechanism is canceled by the above arrangement of the slide pin 31 and the slot hole 38. The slot hole 38 in combination with the rest of the recliner mechanism may be referred to as a first unintentional movement prevention device.

Due to the connection of slide release lever 35 to the slide release lever 30 via the center rotation tube, the slide release lever 35 is similarly prevented from unintended release when the two way motion actuator 10 is moved in the first direction to release the recliner mechanism.

FIG. 12 illustrates the movement of the recliner pull link 16 when the two way motion actuator 10 moves in the second direction. Described above, when the two way motion actuator 10 moves in the second direction, the center rotation link rotates clockwise and moves downward as shown in FIG. 11. FIG. 12 shows that when the center rotation link 14 rotates clockwise, the recliner pull link 16 is pushed rightward as shown by the dashed line. Due to the rightward motion of the recliner pull link 16, the riveting 18 slides in the slot hole 17 towards the leftmost end of the slot hole 18 (as shown in FIG. 12). Therefore, the recliner pull link does not pull the recliner release lever 19 via the riveting 19 to release the recliner mechanism as shown in FIG. 7. Accordingly, the arrangement of the riveting 18 and the slot hole 17 prevents unintended release of the recliner mechanism when the two way motion actuator 10 is moved in the second direction to release the sliding mechanism. That is, the movement of recliner mechanism is canceled by the above arrangement of the riveting 18 and the slot hole 17. The slot hole 17 in combination with the rest of the recliner mechanism may be referred to as a second unintentional movement prevention device.

Accordingly, the mechanism described in detail above can release both the slide mechanism and the recliner mechanism using a single actuator. Moreover, unintentional release of the slide mechanism is prevented when the user intends to operate the recliner release. Similarly, unintentional release of the recliner mechanism is prevented when the user intends to operate the slide release.

Additionally, the mechanism described above has an additional safety feature. That is, if electric power is disconnected from the two way motion actuator then each of the recliner release mechanism and the slide release mechanism are placed in a locked state. This feature is made possible as the locking mechanisms for recline and slide use springs to force the respective lock mechanisms into a locked state when not being released as described above. Thus, a spring force is used to hold the respective actuators in an initial position.

When the two way motion actuator 10 releases the slide mechanism, the two way motion actuator 10 pushes against the slide lock mechanisms including the springs to unlock the seat. If power is disconnected from the two way motion actuator during this operation, the spring force will push the actuator back into its initial state at the same time as locking the seat slide.

When the two way motion actuator 10 releases the recline mechanism, the two way motion actuator 10 pushes against the recliner lock mechanisms including the springs to unlock the seat. If power is disconnected from the two way motion actuator 10 during this operation, the spring force will push the actuator back into its initial state at the same time as locking the seat recliners.

Thus, a single, cost effective and low mass, mechanism can safely release both the recliner mechanism and the slide mechanism of a vehicle seat. Such a system provides a more luxurious feeling than a purely manual mechanism in a cost effective manner compared to a fully power seat. Further, this system provides additional safety benefits when power is disconnected from the seat.

Obviously, numerous modifications and variations of the present invention are possible in light of the above teachings. It is therefore to be understood that within the scope of the appended claims, the invention may be practiced otherwise than as specifically described herein.

The invention claimed is:
1. A release mechanism of a seat, comprising:
a two way motion actuator that moves in both a first direction and in a second direction;
a recliner release mechanism that releases a recliner of the seat in response to the two way motion actuator moving in the first direction;
a slide release mechanism that releases a slide mechanism of the seat in response to the two way motion actuator moving in the second direction;

a push pull link that extends from the two way motion actuator to a rotation link, the rotation link rotating in response to movement by the two way motion actuator; and a center rotation link that is connected to the rotation link by a half tube that extends from the rotation link.

2. The release mechanism of the seat according to claim 1, further comprising:

a first movement device that prevents the slide mechanism from moving when the two way motion actuator moves in the first direction; and a second movement device that prevents the recliner from moving when the two way motion actuator moves in the second direction.

3. The release mechanism of the seat according to claim 1, wherein the two way motion actuator is a motor and the first direction is a first rotation direction of the motor and the second direction is a second rotation direction of the motor.

4. The release mechanism of the seat according to claim 2, wherein the first movement device and the second movement device are slot holes.

5. The release mechanism of the seat according to claim 2, wherein the recliner release mechanism includes a recliner release lever that releases the recliner of the seat, and a recliner pull link that is connected to the center rotation link by a first riveting and connected to the recliner release lever by a second riveting.

6. The release mechanism of the seat according to claim 5, wherein the recliner pull link includes a first slot hole in which the second riveting is configured to slide.

7. The release mechanism of the seat according to claim 6, wherein the first movement device is the first slot hole and when the two way motion actuator moves in the first direction the second riveting contacts an end of the first slot hole so that the recliner pull link moves the recliner release lever and when the two way motion actuator moves in the second direction the second riveting slides within the first slot hole and recliner release lever is unmoved by the center rotation link.

8. The release mechanism of the seat according to claim 2, wherein the slide release mechanism includes a slide release lever that releases the slide mechanism of the seat, and the slide release lever is connected to the to the center rotation link by a slide pin that extends from the center rotation link.

9. The release mechanism of the seat according to claim 8, wherein the slide release lever includes a second slot hole in which the slide pin is configured to slide.

10. The release mechanism of the seat according to claim 9, wherein the second movement device is the second slot hole and when the two way motion actuator moves in the second direction the slide pin contacts an end of the second slot hole so that the slide release lever is moved to release the slide mechanism and when the two way motion actuator moves in the first direction the slide pin slides within the second slot hole and slide release lever is unmoved by the center rotation link.

11. The release mechanism of the seat according to claim 1, wherein if electric power is disconnected from the two way motion actuator then each of the recliner release mechanism and the slide release mechanism are placed in a locked state.

* * * * *